US010735519B2

(12) United States Patent
Kirschner et al.

(10) Patent No.: US 10,735,519 B2
(45) Date of Patent: Aug. 4, 2020

(54) WIRELESS TRAINLINE

(71) Applicant: Bombardier Transportation GmbH, Berlin (DE)

(72) Inventors: Mark Kirschner, Charleroi, PA (US); Joseph P. Schreibeis, Eighty-Four, PA (US); Erik Larsen, Sewickley, PA (US)

(73) Assignee: Bombardier Transportation GmbH, Berlin (DE)

(*) Notice: Subject to any disclaimer, the term of this patent is extended or adjusted under 35 U.S.C. 154(b) by 43 days.

(21) Appl. No.: 15/834,350

(22) Filed: Dec. 7, 2017

(65) Prior Publication Data

US 2018/0159936 A1 Jun. 7, 2018

Related U.S. Application Data

(60) Provisional application No. 62/431,031, filed on Dec. 7, 2016.

(51) Int. Cl.
| | |
|---|---|
| *H04L 29/08* | (2006.01) |
| *B61L 15/00* | (2006.01) |
| *B61L 25/02* | (2006.01) |
| *B61L 25/04* | (2006.01) |
| *B61L 27/00* | (2006.01) |

(52) U.S. Cl.
CPC .......... *H04L 67/12* (2013.01); *B61L 15/0027* (2013.01); *B61L 15/0072* (2013.01); *B61L 15/0081* (2013.01); *B61L 25/028* (2013.01); *B61L 25/04* (2013.01); *B61L 27/0005* (2013.01); *B61L 2205/00* (2013.01)

(58) Field of Classification Search
CPC .. H04L 67/12; B61L 15/0027; B61L 15/0072; B61L 15/0081; B61L 25/028; B61L 25/04; B61L 27/0005; B61L 2205/00; B61L 27/0088
See application file for complete search history.

(56) References Cited

U.S. PATENT DOCUMENTS

| | | | |
|---|---|---|---|
| 2001/0022332 A1* | 9/2001 | Harland | B61L 25/023 246/122 R |
| 2002/0027495 A1* | 3/2002 | Darby, Jr. | H04L 1/188 340/298 |
| 2009/0212168 A1* | 8/2009 | Kumar | B61L 27/0088 246/167 R |
| 2010/0049830 A1* | 2/2010 | Chenu | H04B 3/548 709/218 |

(Continued)

*Primary Examiner* — Wutchung Chu
(74) *Attorney, Agent, or Firm* — The Webb Law Firm

(57) ABSTRACT

In a system for providing computer network connectivity to transit cars that each include first and second mobile radios, and a memory and a processor in each car performing the steps of (a) causing the first and second mobile radios of the car to enter into a far-field mode of operation in communication with a wayside radio; (b) following step (a), the processor of a first car causing its second mobile radio to enter into a couple mode of operation with a first mobile radio of a proximate car; and (c) following step (a), the processor of a second car causing its first mobile radio to enter into a couple mode of operation with a second mobile radio of a proximate car. In the couple mode of operation, first and second mobile radios in proximate cars communicate only with each other.

20 Claims, 3 Drawing Sheets

(56) References Cited

U.S. PATENT DOCUMENTS

| | | | |
|---|---|---|---|
| 2011/0172856 A1* | 7/2011 | Kull | B61L 21/10 701/19 |
| 2011/0267969 A1* | 11/2011 | Ceccherini | H04W 36/0083 370/252 |
| 2014/0094998 A1* | 4/2014 | Cooper | B61L 3/006 701/2 |
| 2014/0129061 A1* | 5/2014 | Cooper | B61C 17/12 701/19 |
| 2014/0161022 A1* | 6/2014 | Yamaguchi | B61L 27/0005 370/315 |
| 2014/0180499 A1* | 6/2014 | Cooper | B61L 27/0005 701/2 |
| 2015/0200712 A1* | 7/2015 | Cooper | B60T 17/228 375/257 |
| 2015/0217790 A1* | 8/2015 | Golden | H04W 4/46 701/19 |
| 2015/0344048 A1* | 12/2015 | Kernwein | B61L 15/0027 701/19 |
| 2015/0375764 A1* | 12/2015 | Rajendran | B61L 15/0027 701/2 |
| 2016/0194014 A1* | 7/2016 | Rajendran | H04W 4/46 701/2 |
| 2017/0066458 A1* | 3/2017 | Huchrowski | B61L 15/0081 |
| 2017/0129512 A1* | 5/2017 | Shubs, Jr. | G07C 5/008 |
| 2018/0027465 A1* | 1/2018 | Karlsson | H04L 67/12 370/331 |
| 2018/0093684 A1* | 4/2018 | Nagrodsky | H04B 3/542 |
| 2018/0359214 A1* | 12/2018 | Janneteau | H04L 61/2514 |
| 2019/0071107 A1* | 3/2019 | Cooper | B61L 15/0027 |

* cited by examiner

WIRELESS TRAINLINE

CROSS-REFERENCE TO RELATED APPLICATION

This application claims the benefit of U.S. Provisional Application No. 62/431,031, filed Dec. 7, 2016, the contents of which are incorporated herein by reference in its entirety.

BACKGROUND OF THE INVENTION

Field of the Invention

The present invention relates to dynamically providing computer network connectivity to a number of rail cars, e.g., transit cars, coupled in series and, more particularly, connecting a number of cars into a single high speed computer network (e.g., 150 Mbps Ethernet network) without the use of inter-car wiring or couplers for said inter-car wiring.

Description of Related Art

Heretofore, prior art high speed computer network connectivity, e.g., an Ethernet network, between cars of a train was provided via a wired network or wired trainline that runs between pairs of proximate cars via one or more connectors (or couplers) between each pair of proximate cars. Within each car, a network switch, e.g., a router, connected to the Ethernet network of the car facilitated connection, i.e., wired or wireless (Wi-Fi) connection, between the Ethernet network and devices in the car, e.g. mobile devices such as, without limitation, mobile phones, tablet computers, laptop computers, or any other type of wired or wireless device.

Connectivity of such prior art high speed computer network to the Internet (provided remote from the train) was provided via a wireless network between the train and the Internet. A typical wireless network includes, off-board/remote from the train, one or more wayside radios connected to the Internet via a wayside network and at least one mobile radio on-board at least one car of the train in communication between the one or more wayside radios and the Ethernet network.

With current industry-standard technology, a train Ethernet network is not fully aware of the train configuration. Hence, the train must be statically configured (permanently married cars) or each car must be independently designed. Other solutions have involved connecting through the couplers between pairs of proximate cars, but again, without the system knowing the train configuration.

SUMMARY OF THE INVENTION

Generally, provided is an improved method and system to connect interior cars of a train over a wireless trainline network to leading and trailing cars of a train. A processor in each car can be aware of the train configuration and can instruct the wireless trainline network to dynamically connect to other cars.

In some non-limiting embodiments or aspects, the improved method and system can save costs by reducing trainline cabling between cars of the train and by reducing or eliminating Ethernet coupling on trainline cabling on proximate cars of the train on coupler-based networks. For example, it is envisioned that Ethernet couplers between proximate cars of a train may be able to eliminated altogether.

In some non-limiting embodiments or aspects, the improved method and system can enable vehicle antennas to be moved from roofs of cars to the forward and rear faces of each car. For example, this can help keep antennas away from tight tunnel envelopes can enhance RF coverage in tunnels by, for example, opening up free space for the Fresnel zone—especially for cars toward the center of the train. This improved method and system can also provide improved vehicle aesthetics.

In some non-limiting embodiments or aspects, each car can include a processor and a memory. The memory can be an integral part of the processor and/or attached to the processor. The memory can store computer program code which, when run by the processor, causes the processor to operate in the manner described hereinafter to control the state of one or more mobile radios of the car to be in a far-field mode of operation in wireless communication with a wayside radio, or a couple mode of operation in wireless communication with a mobile radio in a proximate, coupled car.

In some non-limiting embodiments or aspects, the processor in each car can have with a unique IP address (of a train (Ethernet) network) and the car ID in which the processor resides. For example, the network switch and each mobile radio in each car can have a unique IP address. In this manner each of the processor, the network switch, and each mobile radio of each car can have a unique IP address on the train network that can be addressed independently of each other IP address assigned to any other processor, network switch, and mobile radio of any other car.

In some non-limiting embodiments or aspects, the memory of the processor of each car can include (store) information such as, without limitation, the car ID of each car forming the train, along with the IP address of each processor, network switch, and each mobile radio of each car forming the train, along with the configuration of the cars, namely, the order of cars forming the train.

In some non-limiting embodiments or aspects, a central processor connected to the wayside network can include a memory that can store computer program code which, when run by the central processor, causes the central processor to operate in the manner described hereinafter. For example, the memory of the central processor can include the car ID of each car forming the train, along with the IP address of each processor, network switch, and each mobile radio of each car forming the train, along with the configuration of the cars, namely, the order of cars forming the train.

In some non-limiting embodiments or aspects, armed with this information, the processor of each car and the central processor can have access to the IP address of each processor, network switch, and each mobile radio of each car forming the train, along with the configuration of the cars, namely, the order of cars forming the train. The particular manner by which the memory of the processor of each car and/or the memory of the central processor includes the car ID of each car forming the train, along with the IP address of each processor, network switch, and each mobile radio of each car forming the train, along with the configuration of the cars, namely, the order of cars forming the train, is not to be construed in a limiting sense.

In some non-limiting embodiments or aspects, the central processor can learn how each car is coupled through train configuration commands run on one or more processors of one or more cars. For example, the central processor can be in contact with the processor in each car via a wireless network. Once the processor of each car has learned the train configuration, the processor can cause at least one mobile radio of the car to switch from a far-field mode of operation, where the mobile radio communicates with one or more wayside radios, to a couple mode of operation, where the mobile radio communicates only with a mobile radio in a proximate car.

In some non-limiting embodiments or aspects, to end the couple mode of operation and return to the far-filed mode of operation, the processor in each car, in response to receiving a decouple command, can cause the at least one mobile radio of the car to switch from the couple mode of operation to the far-field mode of operation, where the at least one mobile radio attempts to establish contact with a wayside radio.

Further preferred and non-limiting embodiments or aspects are set forth in the following numbered clauses.

Clause 1: A computer-implemented method of dynamically providing network connectivity to a plurality of transit cars coupled in series, wherein each car includes a first mobile radio at a front end of said car and a second mobile radio at a back end of said car, the method comprising: (a) causing, by at least one processor in each car, at least one of the first and second mobile radios of said car to be in a far-field mode of operation in wireless communication with one or more wayside radios; and (b) following step (a), responding to a couple command received thereby, the at least one processor in each car causing the first and second mobile radios of said car to be connected in a couple mode of operation with respective second and first mobile radios in proximate cars, wherein in the couple mode of operation, the first and second mobile radios in the proximate cars communicate only with each other.

Clause 2: The computer-implemented method of clause 1, further including: (c) following step (b), responding to a decouple command received thereby, the at least one processor in each car causing the first and second mobile radios in said car to be connected in the far-field mode of operation.

Clause 3: The computer-implemented method of clause 1 or 2, further including, following step (c), repeating steps (a) and (b).

Clause 4: The computer-implemented method of any one of clauses 1-3, wherein, in step (c), the decouple command is received wirelessly from at least one wayside radio.

Clause 5: The computer-implemented method of any one of clauses 1-4, wherein, in step (c), the decouple command is received via a human machine interface coupled to at least one processor on-board at least one car.

Clause 6: The computer-implemented method of any one of clauses 1-5, wherein, in step (b), the couple command is received wirelessly by at least one of mobile radios from at least one wayside radio.

Clause 7: A computer-implemented method of dynamically providing network connectivity to a plurality of transit cars coupled in series, wherein each car includes a first mobile radio at a front end of said car and a second mobile radio at a back end of said car, the method comprising: (a) responding to powering up or reset or initialization, at least one the first and second mobile radios of each car entering into a far-field mode of operation in wireless communication with one or more wayside radios; and (b) following step (a), responding to a couple command issued by a central processor, the first and second mobile radios in proximate cars connecting in a couple mode of operation, wherein in the couple mode of operation, the first and second mobile radios in said proximate cars communicate only with each other.

Clause 8: The computer-implemented method of clause 7, further including: (c) following step (b), responding to a decouple command issued by the central processor, the first and second mobile radios in proximate cars disconnecting from the couple mode of operation.

Clause 9: The computer-implemented method of clause 7 or 8, wherein, step (a) includes at least one processor on-board at least one car causing the at least one the first and second mobile radios of each car to enter into a far-field mode of operation upon powering up.

Clause 10: The computer-implemented method of any one of clauses 7-9, wherein, step (b) includes at least one processor on-board at least one car causing the first and second mobile radios in the proximate cars to connect in the couple mode of operation.

Clause 11: A computer-implemented method of dynamically providing network connectivity to a plurality of transit cars coupled in series, wherein each car includes a first mobile radio at a front end of said car and a second mobile radio at a back end of said car, the method comprising: (a) a first processor in a first transit car causing at least one of the first and second mobile radios of the first transit car to operate in a far-field mode of operation in wireless communication with a first wayside radio; (b) a second processor in a second, proximate transit car causing at least one of the first and second mobile radios of the second transit car to operate in a far-field mode of operation in wireless communication with the first wayside radio or a second wayside radio; (c) following steps (a) and (b), the first processor causing the second mobile radio of the first transit car to enter into a couple mode of operation with the first mobile radio of the second transit car; and (d) following steps (a) and (b), the second processor causing the first mobile radio of the second transit car to enter into a couple mode of operation with the second mobile radio of the first transit car.

Clause 12: The computer-implemented method of clause 11, further including: (e) following steps (c) and (d), the first and second processors causing the respective second mobile radio of the first transit car and the first mobile radio of the second transit car to enter into the far-field mode of operation.

Clause 13: The computer-implemented method of clause 11 or 12, wherein steps (c) and (d) are each executed in response to each of the first and second processors receiving a couple command via the at least one of the first and second mobile radios thereof operating in the far-field mode of operation.

Clause 14: The computer-implemented method of any one of clauses 11-13, wherein the couple command is generated by a central processor and is wirelessly communicated via the at least one of the first and second wayside radios to the at least one of the first and second mobile radios of the first and second transit cars.

Clause 15: A system for dynamically providing network connectivity to a plurality of transit cars coupled in series comprising: first and second mobile radios at respective first and second ends of each car, a memory and a processor in each car configured to control the mode of operation of each mobile radio by performing the steps of: (a) the processor of each car causing the first and second mobile radios of the car to enter into a far-field mode of operation in communication with a wayside radio; (b) following step (a), the processor of a first car causing the second radio of the first car to enter into a couple mode of operation with a first radio of a proximate car; and (c) following step (a), the processor of a second car causing the first radio of the second car to enter into a couple mode of operation with a second radio of a proximate car, wherein, in the couple mode of operation, first and second mobile radios in proximate cars communicate only with each other.

Clause 16: The system of clause 15, wherein: step (b) includes the processor of the first car causing the first radio of the first car to enter into a couple mode of operation with a second radio of a proximate car; and step (c) includes the processor of the second car causing the second radio of the second car to enter into a couple mode of operation with a first radio of a proximate car.

Clause 17: The system of clause 15 or 16, wherein step (b) includes the first radio of the first car remaining in the far-field mode of operation.

Clause 18: The system of any one of clauses 15-17, wherein step (c) includes the second radio of the second car remaining in the far-field mode of operation.

Clause 19: The system of any one of clauses 15-18, wherein the first car and the second car are proximate each other.

Clause 20: The system of any one of clauses 15-19, wherein at least one other car is positioned in series between the first car and the second car.

DESCRIPTION OF THE INVENTION

Figure 1:
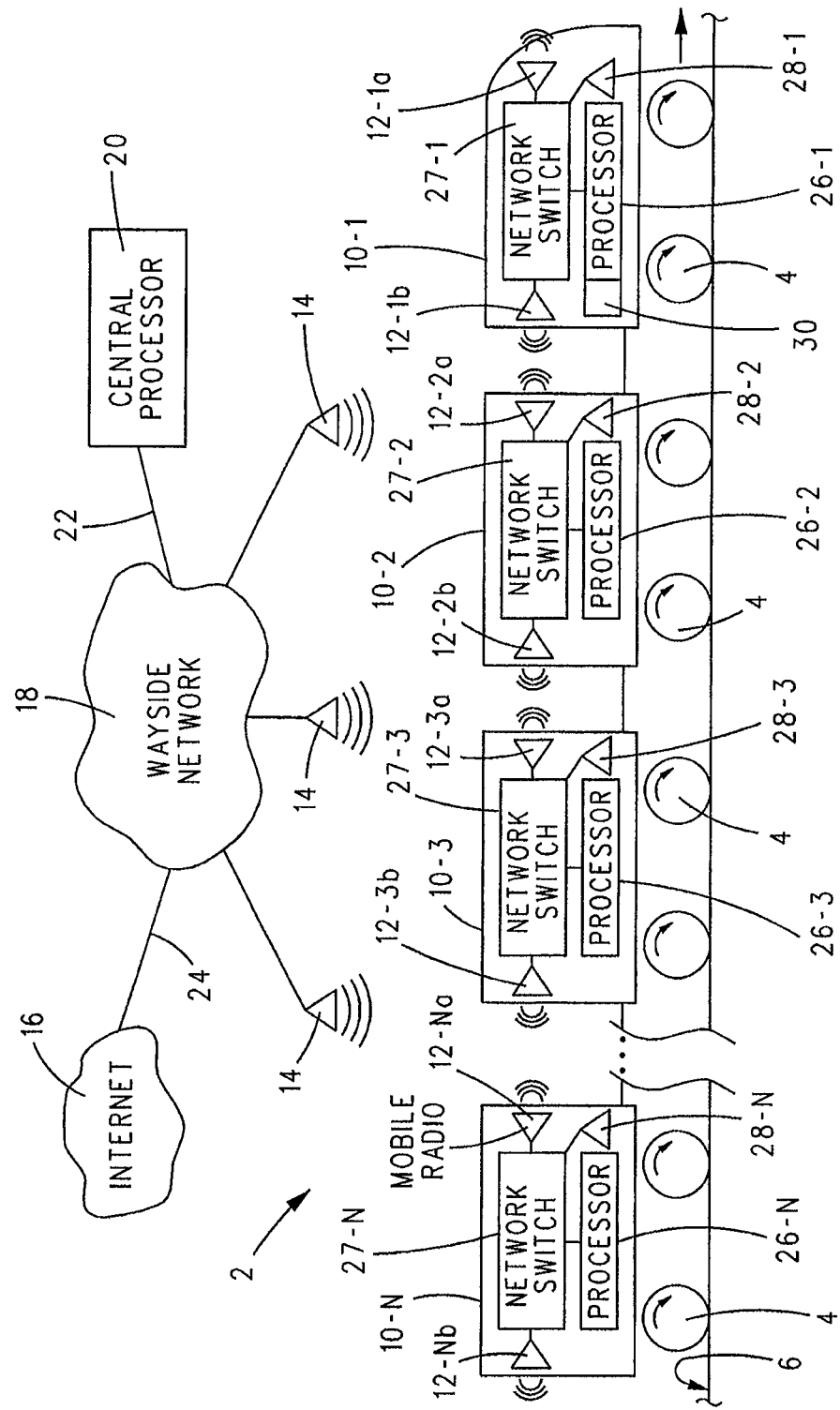
FIG. 1 is a schematic illustration of an example train consist that includes a number of cars, wherein each car includes one or more mobile radios, a network switch, and a processor; and a remote computer network that includes a wayside network connecting wayside radios to the Internet and a central processor according to the principles of the present invention.

For the purposes of the following detailed description, it is to be understood that the invention may assume various alternative variations and step sequences, except where expressly specified to the contrary. It is also to be understood that the specific devices and methods described in the following specification are simply exemplary embodiments, examples, or aspects of the invention. Moreover, other than in any operating examples, or where otherwise indicated, all numbers expressing, in preferred and non-limiting embodiments, examples, or aspects, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the Doctrine of Equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

It is also to be understood that the specific devices and processes illustrated in the attached drawings, and described in the following specification, are simply exemplary embodiments, examples, or aspects of the invention. Hence, specific dimensions and other physical characteristics related to the embodiments, examples, or aspects disclosed herein are not to be considered as limiting. Certain preferred and non-limiting embodiments, examples, or aspects of the present invention will be described with reference to the accompanying figures where like reference numbers and their extensions, e.g., "-1", "-2a", "-Na", and the like, correspond to like or functionally equivalent elements.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

With reference to FIG. 1, in some non-limiting embodiments or aspects, a consist 2, such as, for example, a bus, a train (automated or driver controlled), a subway-type train, or other mass transit vehicle, includes wheels 4 which are configured to travel along a pathway 6. Where pathway 6 is a smooth surface, wheels can be tired wheels. Where pathway 6 includes one or more rails, wheels 4 can be conventional rail wheels designed to travel on said one or more rails.

In some non-limiting embodiments or aspects, consist 2 includes at least two cars 10 but may include any number of cars 10-1-10-N as deemed suitable and/or desirable for a particular application. The example of consist 2 shown in FIG. 1 includes four illustrated cars 10-1, 10-2, 10-3, and 10-N. However, this is not to be construed in a limiting sense.

It is becoming increasingly common to provide wired or wireless (Wi-Fi) computer network service (hereinafter "computer network") in each car 10 of a consist 2. Such computer network can be used to support the provisioning of one or more applications in each car 10 such as, without limitation: closed-circuit TV, audio and/or visual public address announcements, audio and/or visual advertisement, car environment monitoring, consist control data, event data, and/or internet service. WiFi service provided by the computer network can be used by passengers to connect to the Internet 16 via passenger mobile devices such as, without limitation, mobile phones, tablet computers, laptop computers, or any other type of wired or wireless device.

In some non-limiting embodiments or aspects, in connection with providing computer network service in each car 10, each car 10 can include at least one mobile radio 12 that can be operative for wirelessly communicating with one or more wayside backhaul radios 14 positioned along the travel path of consist 2 on pathway 6. Each wayside radio 14 can be connected via a wayside network 18 to a central controller or processor 20 (as shown by line 22 in FIG. 1) or to the Internet 16 (as shown by line 24 in FIG. 1). The particular manner in which central processor 20 and/or Internet 16 communicates with wayside radio(s) 14 is not to be construed in a limiting sense since it is envisioned that any suitable and/or desirable means that facilitates communication between central processor 20 and/or Internet 24 and each wayside radio 14 can be utilized. Herein, each radio 12 and 14 can include an antenna that is not specifically shown in any figure for simplicity of illustration.

In some non-limiting embodiments or aspects, in a first, far-field mode of operation, at least one mobile radio 12 in each car 10 can be configured to be operative to communicate directly with one or more wayside radios 14 along the pathway 6 of consist 2. In this far-field mode of operation, the computer network access within each car 10 can be provided by, for example, a wired and/or wireless computer network access point in said car 10 via an on-board network switch or router 27 (discussed hereinafter) of said car 10 and the at least one mobile radio 12 in said car 10 in direct contact with the one or more wayside radio(s) 14. For example, in the far-field mode of operation, it may only be necessary to utilize one mobile radio 12 in each car 10 to communicate with the one or more wayside radios 14. However, this is not to be construed in a limiting sense, since it is envisioned that any number of mobile radios 12 in each car 10 can be utilized to communicate with the one or more wayside radios 14.

In some non-limiting embodiments or aspects, each car 10 can include a memory and a controller or processor 26 that can utilize the on-board network switch or router 27 of said car 10 to communicate with the mobile radio(s) 12 of said car 10. In this regard, the memory of each processor 26 can know or be programmed its IP address and the IP addresses of the network switch 27 and mobile radio(s) 12 of said car 10 in which said processor 26 resides. Each processor 26 can also know the identity of the car 10 (car ID) in which said processor 26 resides.

In some non-limiting embodiments or aspects, central processor 20 can be pre-programmed with each car ID and the IP addresses of each processor 26, switch 27, and mobile radios 12 of each car 10 of consist 2 or this information can, also or alternatively, be downloaded into central processor 20 via a mobile radio 12 of said car and a wayside radio 14. In addition, central processor 20 can also be pre-programmed with the configuration of cars 10 of consist 2 (also referred to as "consist configuration"); namely, car 10-1 is the first car of consist 2, car 10-2 is the second car of consist 2 . . . and car 10-N is the final car of consist 2. This information can, also or alternatively, be downloaded into central processor 20 via the mobile radios 12 of the cars 10 of consist 2 and one or more wayside radios 14.

A drawback of the first, far-field mode of operation described above is that the mobile radio(s) 12 of one or more cars 10 of consist 2 can periodically fall-out of radio communication with a wayside radio 14 during the movement of consist 2 along pathway 6, e.g., due to interferences, obstructions, etc. A second mode of operation, described next, helps to avoid this drawback.

In some non-limiting embodiments or aspects, in the second mode of operation, via the processor 26 and network switch 27 of each car 10, one or both mobile radios 12 of said car 10 can be configured from the far-field mode of operation, wherein each mobile radio 12 communicates directly with one or more wayside radios 14, to a near-field mode of operation, also described herein as a "couple mode" of operation.

In some non-limiting embodiments or aspects, in the couple mode of operation, the mobile radio 12 at the rear facing end of one car 10 and the mobile radio 12 at the forward facing end of the adjacent or proximate car 10 of consist 2 are placed into communication with each other. For example, mobile radios 12-1b and 12-2a can be placed into communication with each other, mobile radios 12-2b and 12-3a can be placed into communication with each other, etc. This coupling of mobile radios 12 at the back end of one car and the front end of the adjacent or proximate car in series can continue until the mobile radio 12-Na at the front of car 10-N is coupled to the mobile radio at the rear of car 10-(N-1) (not specifically shown) immediately before car 10-N. In this second, couple mode of operation, the mobile radio 12-1a at the front of first car 10-1 and/or the mobile radio 12-Nb at the back end of the final car 10-N can remain in the far-field mode of operation capable of and operative for communicating with one or more wayside radios 14.

In some non-limiting embodiments or aspects, prior to entering into the couple mode of operation, i.e., while in the far-field mode of operation, the processor 26 of each car 10 consist 2 can receive from central processor 20, via one or more wayside radios 14 and at least one mobile radio 12 coupled to said processor 26 via a corresponding network switch 27, the configuration information for consist 2 programmed into central processor 20 along with a command to enter the couple mode of operation. The configuration information received by each processor 26 can include the car ID of each car 10 of consist 2, the IP addresses of the processor 26, switch 27, and mobile radios 12 of each car 10 of consist 2, and the consist configuration of the cars 10 of consist 2. Based on this configuration information, and in response to the couple command received from central processor 20, the processor 26 in each car 10 can modify the operation of at least one mobile radio 12 in said car 10 to operate in the couple mode of operation.

In some non-limiting embodiments or aspects, based on the configuration information received from central processor 20, processor 26-1 (of car 10-1) knowing that car 10-2 is the car proximate to car 10-1, knowing the car ID of car 10-2 and the IP addresses of processor 26-2, switch 27-2, and mobile radio 12-2a can place mobile radio 12-1b of car 10-1 in communication only with mobile radio 12-2a. Similarly, based on the configuration information received from central processor 20, processor 26-2 (of car 10-2) knowing that car 10-1 is the proximate preceding car of consists 2, knowing the car ID of car 10-1 and the IP addresses of processor 26-1, switch 26-1, and mobile radio 12-1b can place mobile radio 12-2a of car 10-2 into communication only with mobile radio 12-1b. In a similar manner, based on knowledge of the consist configuration, car IDs, and IP addresses of the processor 26, switch 27, and mobile radio(s) 12 of each car 10 of consist 2, each processor 26 can place at least one mobile radio 12 of its car 10 in communication only with a single mobile radio 12 of a proximate preceding or proximate following car 10. For example, mobile radio pairs (12-1b, 12-2a), (12-2b, 12-3a), etc. are placed in communication only with each other.

In some non-limiting embodiments or aspects, in the couple mode of operation, however, one or both of the mobile radios 12-1a and 12-Nb at the forward and rear facing ends of the leading car 10-1 and the final car 10-N can remain in the far-field mode of operation communicating with one or more wayside radios 14.

In some non-limiting embodiments or aspects, once mobile radios 12-1b-12-Na are in the couple mode of operation, computer network access in each car 10 can be provided via the network switch 27 in said car 10 via the wireless computer network formed by mobile radios 12-1b-12-Na operating in the couple mode of operation and with at least one of mobile radios 12-1a and 12-Nb operating in the far-field mode of operation as a link to wayside network 18 via one or more wayside radio(s) 14. As can be seen, a mobile radio 12 in the couple mode of operation is operative so that it is only connected to a single mobile radio 12, for example, the closet mobile radio 12, in the adjacent or proximate car.

In some non-limiting embodiments or aspects, when it is desired to terminate the couple mode of operation, the processor 26 of each car 10 can send a decouple command to its mobile radio(s) 12 which, in response, would return to the far-field mode of operation in search of a wayside radio 14. For example, the command to terminate the couple mode of operation can come from central processor 20 to each processor 26 via one or more wayside radios 14 and at least one of the mobile radios 12 operating in the far-field mode.

In some non-limiting embodiments or aspects, while the couple mode of operation described above included two mobile radios, e.g., mobile radios 12-1a and 12-Nb, both being operational in the far-field mode of operation in communication with one or more wayside radio(s) 14, it is envisioned that only one of said mobile radios may be needed to facilitate connection to one or more wayside radios 14. With that said, an obvious advantage of having both wayside radios 12-1a and 12-Nb operating in a far-field mode of operation communicating with one or more wayside radio(s) 14 is that if one of said mobile radios 12-1a and 12-Nb falls out of communication with a wayside radio 14, the other of said mobile radios can still be in contact with said one or more wayside radios 14, thereby maintaining computer network access within the cars 10 of consist 2.

In some non-limiting embodiments or aspects, also or alternatively to one or both mobile radios 12-1a and 12-Nb being in the far-field mode of operation communicating with one or more wayside radios 14 when at least one mobile radio 12 in each car 10 is operated in the couple mode of operation, it is envisioned that one or more of mobile radios 12-1b-12-Na can also or alternatively be operated in the far-field mode of operation when the other mobile radios 12 in adjacent proximate cars 10 of consist 2 are in the couple mode of operation. For example, mobile radios 12-1a, 12-2b, 12-3a, and 12-Nb can be in the far-field mode of operation, while the other mobile radios 12 of consist 2 can be in the couple mode of operation. In this example, consist 2 can include two separate computer networks. Namely, a first computer network for cars 10-1 and 10-2, and second computer network from cars 10-3 through 10-N.

In some non-limiting embodiments or aspects, each pair of mobile radios 12 in adjacent or proximate cars 10 that are in communication with each other in the couple mode of operation can be referred to herein as a "couple mobile radio pair". For example, generally, the couple mode of operation can be realized by one or more couple mobile radio pairs providing computer network access in two or more adjacent or proximate cars 10, wherein at least one mobile radio in at least one of said cars 10 is operated in the far-field mode of operation. For example, in other words, computer network access in two or more adjacent or proximate cars 10 can be realized by one or more couple mobile radio pairs and at least one mobile radio in at least one of said cars 10 is operating in the far-field mode of operation.

Referring now to the flowchart of FIGS. 2A-2B and with continuing reference to FIG. 1, an example method of switching one mobile radio 12 from the first, far-field mode of operation to the second, couple mode of operation will now be described. For the purpose of this example, it will be assumed at the conclusion of the method that mobile radios 12-1a and 12-Nb will be operated in the far-field mode of operation and mobile radios 12-1b-12-Na will be operated in the couple mode of operation. However, this example is only for the purpose of illustration and not to be construed in a limiting sense.

In some non-limiting embodiments or aspects, starting from a state in which one or more or all of mobile radios 12 of consist 2 are in the first, far-field mode of operation, the method advances from start step 30 to step 32, wherein central processor 20 generates a signal, an instruction, or a command (e.g., a "couple command") for one or both mobile radios 12 of each car 10 to enter into the couple mode of operation. In step 34, this couple command is sent to one or more wayside radios 14 via wayside network 18. In step 36, the one or more wayside radios 14 receiving the couple command transmit or broadcast said couple command to mobile radios 12-1a-12-Nb that are currently in the far-field mode of operation communicating with the one or more wayside radios 14.

In step 38, the couple command received by one or more mobile radios 12 of each car 10 is communicated via the network switch 27 of said car 10 to the processor 26 of said car 10. In step 40, the processor 26 of each car 10, in response to receiving the couple command, issues a signal, an instruction, or a command to at least one of its two radios to enter the couple mode of operation using the configuration information for consist 2, which configuration information can be programmed in the processor 26 memory of each car 10 or downloaded to the processor 26 memory of each car, e.g. or with the couple command. As shown in step 42, the processor 26 of each car 10 knows its car ID and the IDs of the radios in said car.

In step 44, the processor 26 of each car 10 determines if the radio(s) in said car 10 is/are operating in the far-field mode of operation. If so, the method advances to step 50, where the processor 26, via the network switch 27, commands at least one mobile radio 12 of its car 10 to enter into the couple mode of operation.

In some non-limiting embodiments or aspects, via the configuration information, the processor 26 of each car 10 can determine which mobile radio 12 of said car 10 to connect in the couple mode of operation or the far-field mode of operation. For example, via the configuration information, the processor 26-1 of car 10-1 will know that it is the first car of the consist 2 and that car 10-2 is the next car of the consist. Based on this, processor 26-1 of car 10-1 can determine that mobile radio 12-1a is to remain in the far-field mode of operation and that mobile radio 12-1b is to enter into the couple mode of operation with mobile radio 12-2a of car 10-2. Similarly, the processor 26-2 of car 10-2 will know (via the configuration information) that it is the second car of the consist 2, that car 10-1 is the first car of the consist and that car 10-3 is the third car of the consist 2. Based on this, processor 26-2 of car 10-2 can determine that mobile radio 12-2a is to enter into the couple mode of operation with mobile radio 12-1b of car 10-2, and that mobile radio 12-2b is to enter into the couple mode of operation with mobile radio 12-3a of car 10-3. In a similar manner, the processor 12 of each car 10 can (via the configuration information) determine whether to connect each of its mobile radios 12 in the couple mode of operation or the far-field mode of operation. For example, via their respective processors 26, only mobile radios 12-1a and 12-Nb can be connected (or remain) in the far-field mode of operation while the other mobile radios 12 of consists 2 can be connected in the couple mode of operation.

In step 52, the radio 12 receives the command to enter the couple mode of operation. In step 54, the radio receiving the command to enter the couple mode of operation is configured to connect only to the radio of the adjacent, proximate car 10. For example, if, in step 52, radio 12-1b receives the command to go into the couple mode of operation, in step 54 mobile radio 12-1b changes its mode of operation to only connect to radio 12-2a of the proximate, coupled car 10-2.

In step 56, each radio 12 in the couple mode of operation reduces the output power of its transceiver. For example, the order of steps 54 and 56 can be reversed or functions performed in steps 54 and 56 can be merged into a single step. For example, each radio 12 and 14 described herein can be comprised of a transceiver that facilitates said radio transmitting and receiving RF signals.

In some non-limiting embodiments or aspects, to facilitate the couple mode of operation, wherein mobile radios 12 in adjacent, proximate cars 10 are coupled in communication only with each other, and each mobile radio 12 upon entering into the couple mode of operation reduces its output power (over the output power used by said radio 12 in the far-field mode of operation), said mobile radio 12 operating in the couple mode of operation is, desirably, able to communication continuously and effectively only with the closest available mobile radio 12 in the adjacent, proximate car 10. For example, when switching from the far-field mode of operation to the couple mode of operation, processor 26-1 causes mobile radio 12-1b to enter into the couple mode of operation of operation and processor 26-2 causes mobile radio 12-2a to enter into the couple mode of operation of operation. With mobile radios 12-1b and 12-2a are in the couple mode of operation, said radios can effectively communicate only with each other. In other words, when operating in the couple mode of operation, each mobile radio 12 cannot effectively or continuously communicate with any other mobile radio 12, other than the closest available mobile radio 12 in the adjacent, proximate car 10.

In some non-limiting embodiments or aspects, via the car ID's and the IP addresses of the radio(s) 12, network switch 27, and processor 26 in each car 10, as well as switching mobile radio(s) 12 from high power operation (when in the far-field mode of operation) to low power operation (when in the couple mode of operation), each mobile radio 12 can be configured to only communicate with a mobile radio 12 in an adjacent, proximate car 10. Other benefits of a low power mode of operation of a mobile radio 12 include: (1) communication with one or more wayside radios 14 by said mobile radio 12 is avoided, and (2) the power of RF signals output by said mobile radio 12 do not oversaturate an antenna of an adjacent mobile radio 12 coupled in the couple mode of operation.

In step 58, the processor 26 of the car 10 determines if the mobile radio 12 is connected in communication to an adjacent, proximate mobile radio 12. For example, processor 26-1 can determine that its mobile radio 12-1b it is connected in communication with mobile radio 12-2a via the IP address of its mobile radio 12-2a. Similarly, processor 26-2 can determine that mobile radio 12-2a is connected in communication with mobile radio 12-1b via the IP address of mobile radio 12-1b. Also or alternatively, car IDs of adjacent cars 10 and/or IP address of network switches 27 in proximate cars 10 can be used to connected adjacent, proximate mobile radios 12 in adjacent, proximate cars 10 in communication only with each other. The particular manner in which adjacent, proximate mobile radio 12 in adjacent, proximate cars 10 are connected in the couple mode of operation is not to be construed in a limiting sense.

Returning to step 44, if the processor 26 determines that a mobile radio 12 is not operating in a far-field mode of operation, the method advances to step 46, wherein the processor 26 determines that the mobile radio 12 is already in the couple mode of operation. Under this scenario, it is assumed that the mobile radio is not in communication with an adjacent, proximate mobile radio 12. Accordingly, in step 48, the processor 26 commands the mobile radio 12 to change connections to a new mobile radio 12 in an adjacent, proximate car 10, e.g., using the configuration information. Following step 48, the method advances to step 58, wherein the processor 26 determines if the mobile radio 12 is connected to an adjacent, proximate mobile radio 12. If, in step 58, the processor 26 determines that the mobile radio 12 is not connected to an adjacent, proximate mobile radio, the method advances to step 60, wherein said mobile radio 12 attempts to connect to an adjacent, proximate mobile radio 12 for a predetermined interval of time, e.g., two minutes. If, in step 60, the attempt to connect to an adjacent mobile radio is unsuccessful, the method advances to step 62, wherein the mobile radio returns to the far-field mode of operation and the method returns to step 44.

If, in step 58 or step 60, the processor 26 determines that the mobile radio 12 is connected to an adjacent mobile radio, the method advances to step 64, where the processor 26 deems the mobile radios to be communicating in the couple mode of operation. The method then advances to step 66 wherein the fact that the mobile radios of adjacent cars are operating in the couple mode of operation is communicated by the processor 26 to central processor 20 via one or both of mobile radios 12-1a and 12-Nb operating in the far-field mode of operation and one or more wayside radios 14. The method then advances to stop step 68.

Figure 2A:
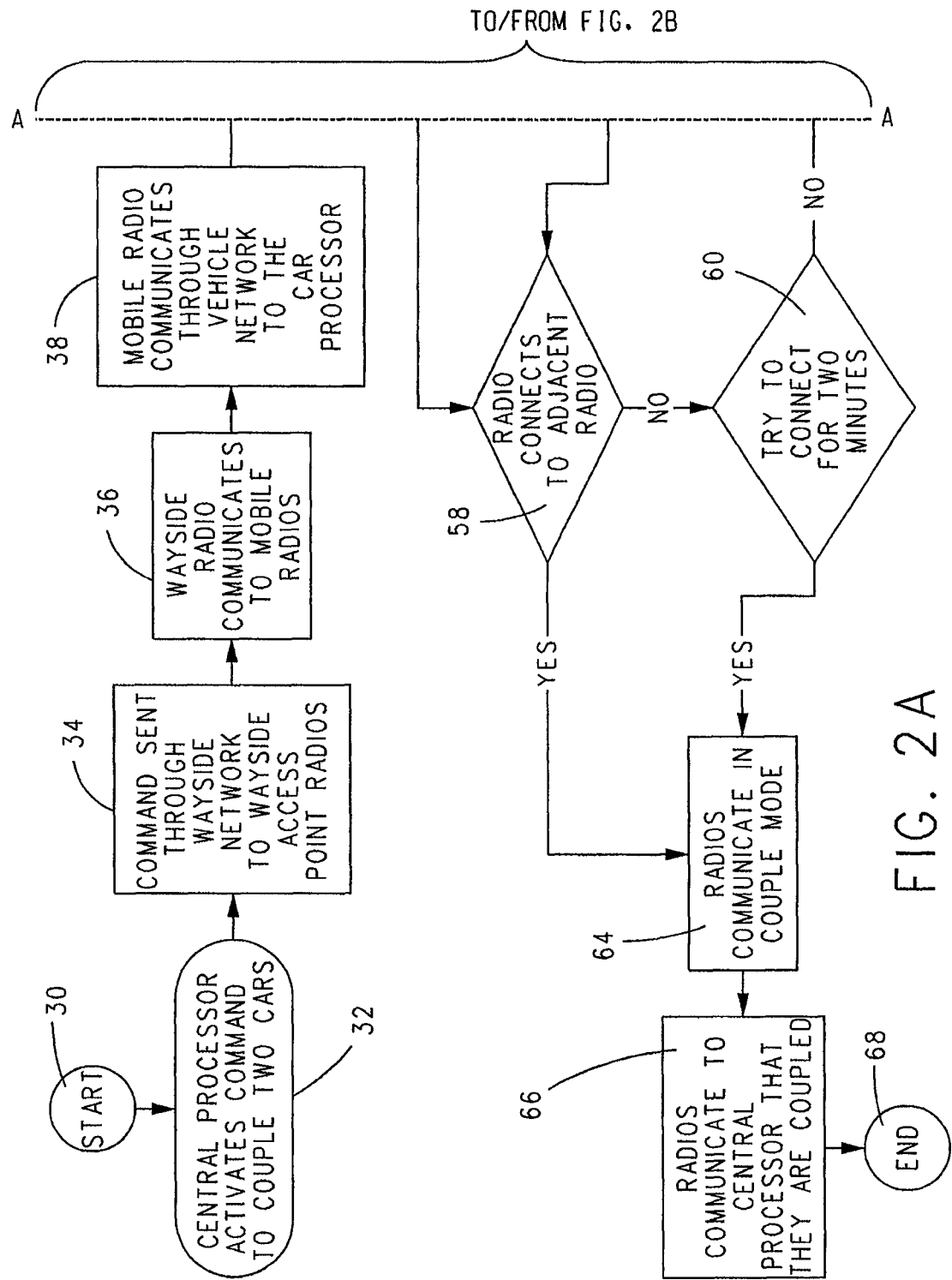
FIGS. 2A-2B are a flowchart of a method of switching one or more mobile radios of each car from a first, far-field mode of operation to a second, couple mode of operation according to the principles of the present invention.
Figure 2B:
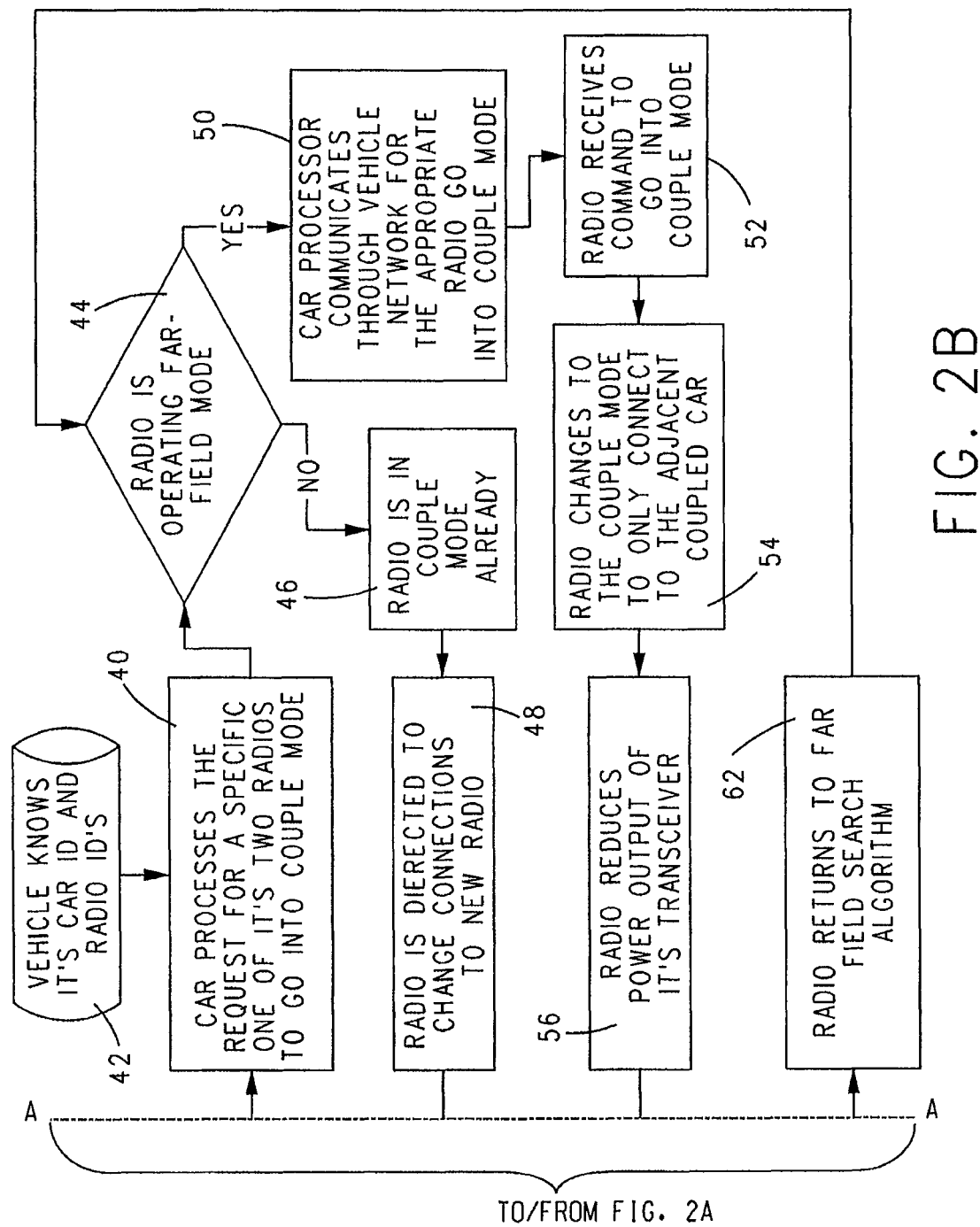

In some non-limiting embodiments or aspects, the flowchart of FIGS. 2A-2B generally describes the process of coupling one mobile radio 12 in the couple mode of operation with another mobile radio. It is to be appreciated that the same process can be employed for coupling each mobile radio 12 of consist 2 in the couple mode of operation with a mobile radio 12 of an adjacent, proximate car 10. Accordingly, the flowchart of FIGS. 2A-2B and the foregoing description are not to be construed in a limiting sense.

As can be seen, the wireless trainline described herein connects interior cars over a wireless trainline network to leading and/or trailing cars. Controlling devices (processor 26) in each car can be aware of the consist configuration and can instruct the wireless trainline to dynamically connect to other cars. Advantages of the wireless trainline described herein is reduced trainline cabling in married pairs of cars 10 and reduced or eliminated Ethernet coupling pins on coupler-based networks. Another advantage is that car antennas can potentially be removed off the roof of cars to the forward and rear faces of each car. This keeps antennas away from tight tunnel envelopes and can enhance RF coverage in tunnels. Another advantage is that a consist 2 in a tunnel (especially a small envelope type tunnels) will not need to rely on as many wayside radios 14 or a leaky cabling to achieve sufficient computer network coverage to cars 10 in the middle of the consist 2. Therefore, tunnel communication systems can be built with less infrastructure and cost.

Finally, when it is desired to terminate the couple mode of operation, the processor 26 of each car 10 can send a decouple command to the mobile radio(s) 12 in said car. At this point, the mobile radio(s) operating in the couple mode can return to the far-field mode of operation and begin to search for wayside radios 14 and, optionally, can be a backup for a leading or trailing mobile radio(s) 12 of consist 2.

In some non-limiting embodiments or aspects, the command for mobile radios 12 to enter or terminate the couple mode of operation can be supplied by an operator of the consist 2 via one of the processors 26, e.g., via a human machine interface (HMI) 30 coupled to, for example, processor 26-1 of the lead car 10.

In some non-limiting embodiments or aspects, electrical headers (part of a trainline used exclusively for train signaling and control purposes—not part of a computer network that supports the provisioning of application in each car) coupling together adjacent cars 10 can be used by the processor 26 of each car 10 to pass the car ID and IP addresses of the processor 26, switch 27, and mobile radio(s) 12 of said car to the other car, and vice versa. As cars are added to the consist 2 when coupling electrical headers of proximate cars 10 together, the car ID and IP addresses of the processor 26, switch 27, and mobile radio(s) 12 of each car as well as the location of each car of the consist 2 can be communicated to and stored on the processor 26 of each car 10. Based on this, once all of the cars 10 of the consist 2 have been finalized, adjacent mobile radios 12 in adjacent cars 10 can be placed in the couple mode of operation without the need for configuration information to be downloaded from central processor 20 to each processor 26.

In some non-limiting embodiments or aspects, each mobile radio 12 of a car 10, under the control of the processor 26 of car 10, can be controlled upon power being initially applied, upon reset, or upon initialization to enter into the far-field mode of operation. However, this is not to be construed in a limiting sense.

In some non-limiting embodiments or aspects, the description of each car 10 having a processor 26 is not to be construed in a limiting sense since it is envisioned that a single processor 26 in one car 10 and a single switch 27 in the same or a different car 10 can control three or more mobile radios 12 in two or more cars 10.

In some non-limiting embodiments or aspects, each processor 20 and 26 can include or can be coupled to a computer memory which can store firmware and/or software which, when run by said processor, causes the processor to operate in the manner described above.

As can be seen, disclosed herein is a computer-implemented method of dynamically providing network connectivity to a plurality of transit cars coupled in series, wherein each car includes a first mobile radio at a front end of said car and a second mobile radio at a back end of said car. The method can comprise: step (a) causing, by at least one processor in each car, at least one of the first and second mobile radios of said car to be in a far-field mode of operation in wireless communication with one or more wayside radios; and step (b) following step (a), responding to a couple command received thereby, the at least one processor in each car causing the first and second mobile radios of said car to be connected in a couple mode of operation with respective second and first mobile radios in proximate cars, wherein in the couple mode of operation, the first and second mobile radios in the proximate cars communicate only with each other.

The method can further include, step (c), following step (b), responding to a decouple command received thereby, the at least one processor in each car causing the first and second mobile radios in said car to be connected in the far-field mode of operation.

The method can include, following step (c), repeating steps (a) and (b).

In the method, step (c) can include the decouple command received wirelessly from at least one wayside radio.

In the method, step (c) can include the decouple command received via a human machine interface coupled to at least one processor on-board at least one car.

In the method, step (b) can include the couple command received wirelessly by at least one of mobile radios from at least one wayside radio.

In the method, step (b) can include the first mobile radio in the first car of the train and the second mobile radio in the last car of the train can be in the far-field mode of operation when the other mobile radios of the train are in the couple mode of operation.

Also disclosed herein is a computer-implemented method of dynamically providing network connectivity to a plurality of transit cars coupled in series, wherein each car includes a first mobile radio at a front end of said car and a second mobile radio at a back end of said car. The method can comprise: (a) responding to powering up or reset or initialization, at least one the first and second mobile radios of each car entering into a far-field mode of operation in wireless communication with one or more wayside radios; and (b) following step (a), responding to a couple command issued by a central processor, the first and second mobile radios in proximate cars connecting in a couple mode of operation, wherein in the couple mode of operation, the first and second mobile radios in said proximate cars communicate only with each other.

The method can further include, step (c), following step (b), responding to a decouple command issued by the central processor, the first and second mobile radios in proximate cars disconnecting from the couple mode of operation. The method can further include, following step (c), at least one of said first and second mobile radios in said proximate cars can enter into the far-field mode of operation.

In the method, step (a) can include at least one processor on-board at least one car causing the at least one the first and second mobile radios of each car to enter into a far-field mode of operation upon powering up.

In the method, step (b) can include at least one processor on-board at least one car causing the first and second mobile radios in the proximate cars to connect in the couple mode of operation.

Also disclosed herein is a computer-implemented method of dynamically providing network connectivity to a plurality of transit cars coupled in series, wherein each car includes a first mobile radio at a front end of said car and a second mobile radio at a back end of said car. The method can comprise: (a) a first processor in a first transit car causing at least one of the first and second mobile radios of the first transit car to operate in a far-field mode of operation in wireless communication with a first wayside radio; (b) a second processor in a second, proximate transit car causing at least one of the first and second mobile radios of the second transit car to operate in a far-field mode of operation in wireless communication with the first wayside radio or a second wayside radio; (c) following steps (a) and (b), the first processor causing the second mobile radio of the first transit car to enter into a couple mode of operation with the first mobile radio of the second transit car; and (d) following steps (a) and (b), the second processor causing the first mobile radio of the second transit car to enter into a couple mode of operation with the second mobile radio of the first transit car.

The method can further include, step (e), following steps (c) and (d), the first and second processors can cause the respective second mobile radio of the first transit car and the first mobile radio of the second transit car to enter into the far-field mode of operation.

In the method, steps (c) and (d) can each be executed in response to each of the first and second processors receiving a couple command via the at least one of the first and second mobile radios thereof operating in the far-field mode of operation.

In the method, the couple command can be generated by a central processor and can be wirelessly communicated via the at least one of the first and second wayside radios to the at least one of the first and second mobile radios of each of the first and second transit cars.

Also disclosed herein is a system for dynamically providing network connectivity to a plurality of transit cars coupled in series. The system can comprise: first and second mobile radios at respective first and second ends of each car, and a memory and a processor in each car configured to control the mode of operation of each mobile radio by performing the steps of: (a) the processor of each car issuing a signal, an instruction, or a command to the first and second mobile radios of the car to enter into a far-field mode of operation in communication with one or more wayside radios; (b) following step (a), the processor of a first car issuing a signal, an instruction, or a command to the second radio of the first car to enter into a couple mode of operation with a first radio of a proximate car; and (c) following step (a), the processor of a second car issuing a signal, an instruction, or a command to the first radio of the second car to enter into a couple mode of operation with a second radio of a proximate car, wherein, in the couple mode of operation, first and second mobile radios in proximate cars communicate only with each other.

In the method, step (b) can include the processor of the first car issuing a signal, an instruction, or a command to the first radio of the first car to enter into a couple mode of operation with a second radio of a proximate car. In the method, step (c) can include the processor of the second car issuing a signal, an instruction, or a command to the second radio of the second car to enter into a couple mode of operation with a first radio of a proximate car.

In the method, step (b) can include the processor of the first car maintaining the first radio of the first car in the far-field mode of operation. Step (c) can include the processor of the second car maintaining the second radio of the second car in the far-field mode of operation.

The first car and the second car can be proximate each other.

At least one other car can be positioned in series between the first car and the second car.

Although the invention has been described in detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect.

The invention claimed is:

1. A computer-implemented method comprising:
   (a) causing, by at least one processor in each car of a plurality of transit cars of a consist coupled in series, wherein each car includes a first mobile radio at a front end of said car and a second mobile radio at a back end of said car, at least one of the first and second mobile radios of said car to be in a far-field mode of operation in wireless communication with one or more wayside radios; and
   (b) following step (a), responding to a couple command received thereby, the at least one processor in each car causing the first and second mobile radios of said car to be connected in a couple mode of operation with respective second and first mobile radios in proximate cars, wherein in the couple mode of operation, the first and second mobile radios in the proximate cars communicate only with each other.

2. The computer-implemented method of claim 1, further including:
   (c) following step (b), responding to a decouple command received thereby, the at least one processor in each car causing the first and second mobile radios in said car to be connected in the far-field mode of operation.

3. The computer-implemented method of claim 2, further including, following step (c), repeating steps (a) and (b).

4. The computer-implemented method of claim 2, wherein, in step (c), the decouple command is received wirelessly from at least one wayside radio.

5. The computer-implemented method of claim 2, wherein, in step (c), the decouple command is received via a human machine interface coupled to at least one processor on-board at least one car.

6. The computer-implemented method of claim 1, wherein, in step (b), the couple command is received wirelessly by at least one of mobile radios from at least one wayside radio.

7. A computer-implemented method comprising:
   (a) in a consist comprising a plurality of transit cars coupled in series, wherein each car includes a first mobile radio at a front end of said car and a second mobile radio at a back end of said car, responding to powering up or reset or initialization, at least one the first and second mobile radios of each car entering into a far-field mode of operation in wireless communication with one or more wayside radios; and
   (b) following step (a), responding to a couple command issued by a central processor, the first and second mobile radios in proximate cars connecting in a couple mode of operation, wherein in the couple mode of operation, the first and second mobile radios in said proximate cars communicate only with each other.

8. The computer-implemented method of claim 7, further including:
   (c) following step (b), responding to a decouple command issued by the central processor, the first and second mobile radios in proximate cars disconnecting from the couple mode of operation.

9. The computer-implemented method of claim 7, wherein, step (a) includes at least one processor on-board at least one car causing the at least one the first and second mobile radios of each car to enter into a far-field mode of operation upon powering up.

10. The computer-implemented method of claim 7, wherein, step (b) includes at least one processor on-board at least one car causing the first and second mobile radios in the proximate cars to connect in the couple mode of operation.

11. A computer-implemented method comprising:
    (a) in a consist comprising a plurality of transit cars coupled in series, wherein each car includes a first mobile radio at a front end of said car and a second mobile radio at a back end of said car, a first processor in a first transit car causing at least one of the first and second mobile radios of the first transit car to operate in a far-field mode of operation in wireless communication with a first wayside radio;

(b) a second processor in a second, proximate transit car causing at least one of the first and second mobile radios of the second transit car to operate in a far-field mode of operation in wireless communication with the first wayside radio or a second wayside radio;

(c) following steps (a) and (b), the first processor causing the second mobile radio of the first transit car to enter into a couple mode of operation only with the first mobile radio of the second transit car; and (d) following steps (a) and (b), the second processor causing the first mobile radio of the second transit car to enter into a couple mode of operation only with the second mobile radio of the first transit car.

12. The computer-implemented method of claim 11, further including:

(e) following steps (c) and (d), the first and second processors causing the respective second mobile radio of the first transit car and the first mobile radio of the second transit car to enter into the far-field mode of operation.

13. The computer-implemented method of claim 11, wherein steps (c) and (d) are each executed in response to each of the first and second processors receiving a couple command via the at least one of the first and second mobile radios thereof operating in the far-field mode of operation.

14. The computer-implemented method of claim 13, wherein the couple command is generated by a central processor and is wirelessly communicated via the at least one of the first and second wayside radios to the at least one of the first and second mobile radios of each of the first and second transit cars.

15. A system comprising:

first and second mobile radios at respective first and second ends of each car of a plurality of transit cars of a consist coupled in series, a memory and a processor in each car configured to control the mode of operation of each mobile radio by performing the steps of:

(a) the processor of each car causing the first and second mobile radios of the car to enter into a far-field mode of operation in communication with a wayside radio;

(b) following step (a), the processor of a first car causing the second radio of the first car to enter into a couple mode of operation with a first radio of a proximate car; and (c) following step (a), the processor of a second car causing the first radio of the second car to enter into a couple mode of operation with a second radio of a proximate car, wherein, in the couple mode of operation, first and second mobile radios in proximate cars communicate only with each other.

16. The system of claim 15, wherein:

step (b) includes the processor of the first car causing the first radio of the first car to enter into a couple mode of operation with a second radio of a proximate car; and step (c) includes the processor of the second car causing the second radio of the second car to enter into a couple mode of operation with a first radio of a proximate car.

17. The system of claim 15, wherein step (b) includes the first radio of the first car remaining in the far-field mode of operation.

18. The system of claim 15, wherein step (c) includes the second radio of the second car remaining in the far-field mode of operation.

19. The system of claim 15, wherein the first car and the second car are proximate each other.

20. The system of claim 15, wherein at least one other car is positioned in series between the first car and the second car.

* * * * *

UNITED STATES PATENT AND TRADEMARK OFFICE
CERTIFICATE OF CORRECTION

PATENT NO.          : 10,735,519 B2
APPLICATION NO.     : 15/834350
DATED               : August 4, 2020
INVENTOR(S)         : Mark Kirschner et al.

Page 1 of 1

It is certified that error appears in the above-identified patent and that said Letters Patent is hereby corrected as shown below:

In the Claims

Column 16, Line 38, Chaim 7, after "one" insert -- of --

Column 16, Line 56, Claim 9, after "at least one" insert -- of --

Column 18, Line 33, Claim 19, after "proximate" insert -- to --

Signed and Sealed this
Fifteenth Day of December, 2020

Andrei Iancu
*Director of the United States Patent and Trademark Office*